United States Patent
Jakob

[11] Patent Number: 6,080,078
[45] Date of Patent: Jun. 27, 2000

[54] PLANETARY GEAR WITH COMPENSATING COUPLING

[75] Inventor: Ludwig Jakob, Kleinwallstadt, Germany

[73] Assignee: Jakob GmbH & Co. Antriebstechnik KG, Kleinwallstadt, Germany

[21] Appl. No.: 09/340,214

[22] Filed: Jun. 25, 1999

[30] Foreign Application Priority Data

Jul. 10, 1998 [DE] Germany .......................... 198 30 862

[51] Int. Cl.⁷ ...................................................... F16H 5/08
[52] U.S. Cl. .......................... 475/346; 475/331; 475/347; 464/78; 464/79; 74/655
[58] Field of Search .................................... 475/344, 331, 475/346, 347; 464/78, 79, 80; 74/640, 655, 661

[56] References Cited

U.S. PATENT DOCUMENTS

| | | | |
|---|---|---|---|
| 3,293,948 | 12/1966 | Jarchow et al. | 74/801 |
| 5,917,259 | 6/1999 | Stridsberg | 310/75 D |

FOREIGN PATENT DOCUMENTS

| | | |
|---|---|---|
| 444 697 | 5/1927 | Germany . |
| 1 197 709 | 7/1965 | Germany . |
| 2 540 259 | 3/1977 | Germany . |
| 139 445 | 1/1980 | Germany . |

*Primary Examiner*—Charles A Marmor
*Assistant Examiner*—Tisha D. Waddell
*Attorney, Agent, or Firm*—Flynn, Thiel, Boutell & Tanis, P.C.

[57] ABSTRACT

A planetary gear is described, with a compensating coupling (9), a housing (1) enclosing the gear (2) and the compensating coupling and a planet wheel carrier (3), which has a shaft journal (4) rotatably mounted in the housing. The compensating coupling is provided on the input side of the gear (2) and its gear-side coupling part (10) at the same time forms a component of the gear and is rotatably mounted in the housing. A second compensating coupling (14) is provided on the output side of the gear (2), its gear-side coupling part (15) having a projection (17) which engages in frictional and/or interlocking manner in a recess (13) in the shaftjournal (4). The housing (1) has a housing section (1c) on the output side of the gear (2) which is an integral component of the housing (1) and encloses the second compensating coupling (14). (FIG. 1)

9 Claims, 3 Drawing Sheets

PLANETARY GEAR WITH COMPENSATING COUPLING

This invention relates to a planetary gear with a compensating coupling, a housing enclosing the gear and the compensating coupling and a planet wheel carrier, which has a shaft journal rotatably mounted in the housing, wherein the compensating coupling is provided on the input side of the gear and its gear-side coupling part at the same time forms a component of the gear and is rotatably mounted in the housing.

In one such known planetary gear with a compensating coupling the latter is formed as a metal bellows coupling. In order to achieve a compact construction, especially in the axial direction, the compensating coupling is integrated in the housing of the planetary gear, i.e. the housing of the planetary gear at the same time encloses the compensating coupling. Furthermore the coupling part on the gear side, namely the gear-side bellows carrier, also forms a component of the gear. The sun wheel comprises a pin which is fitted rotationally fast in a bore of the bellows carrier. The sun wheel is simultaneously mounted rotatably relative to the gear housing by means of the bellows carrier, which is surrounded by a ball bearing. Axial, angular and lateral offsets for example are to be compensated for by means of the compensating coupling provided on the input side, so that the smallest possible loading of the bearing arises from the drive element to the planetary gear. In this known planetary gear the shaft journal of the planet wheel carrier comprises a shaft end projecting to the output drive side of the planetary gear through the bearing of the shaft journal, which serves for attachment to the element to be driven, such a spindles or crankshafts for example. If axial, angular and lateral offset compensation is also to be provided on the output drive side, it is necessary firstly to connect a further, separate compensating coupling to the free shaft end. This separate compensating coupling then has to be enclosed in a part like a housing, namely a so-called attachment bell. The overall axial structural length is increased substantially by the separate compensating coupling, whose gear-side coupling part is clamped or otherwise fixed on the shaft end. Moreover a substantial added construction expense is necessary, in order to attach the attachment bell.

The invention is therefore based on the object of providing a planetary gear with a compensating coupling of the kind initially referred to, which carries a compensating coupling on the output drive side but which has a compact structure and a smaller weight and which can be fitted with smaller expense.

This is achieved according to the invention in that a second compensating coupling is provided on the output side of the gear, its gear-side coupling part having a projection which engages in frictional and/or interlocking manner in a recess in the shaft journal, and in that the housing has a housing section on the output side of the gear which is an integral component of the housing and encloses the second compensating coupling.

The invention is therefore based on the concept of integrating the second compensating coupling in the housing of the planetary gear and to let a projection of the gear-side coupling part of the second compensating coupling engage directly in the shaft journal of the planet wheel carrier, dispensing with a shaft end. Through this there is achieved a substantially more compact structure with smaller axial dimensions, smaller weight and simpler fitting. The stiffness of the overall construction of the planetary gear with torsionally stiff compensating couplings on the input side and the output side.

A particularly advantageous arrangement of the invention consists in that the is projection of the gear-side coupling part and the recess in the shaft journal extend into the region thereof surrounded by the bearing. A particularly compact structure in the axial direction can be achieved through this, since the torque-trasmitting connection between the shaft journal and the gear-side coupling part is placed essentially in the shaft journal and thus does not require any space in the axial direction of the planetary gear.

Further advantageous arrangements of the invention are characterized in the other dependent claims.

The invention will now be explained in more detail with reference to embodiments shown in the drawings, in which.

Figure 1:
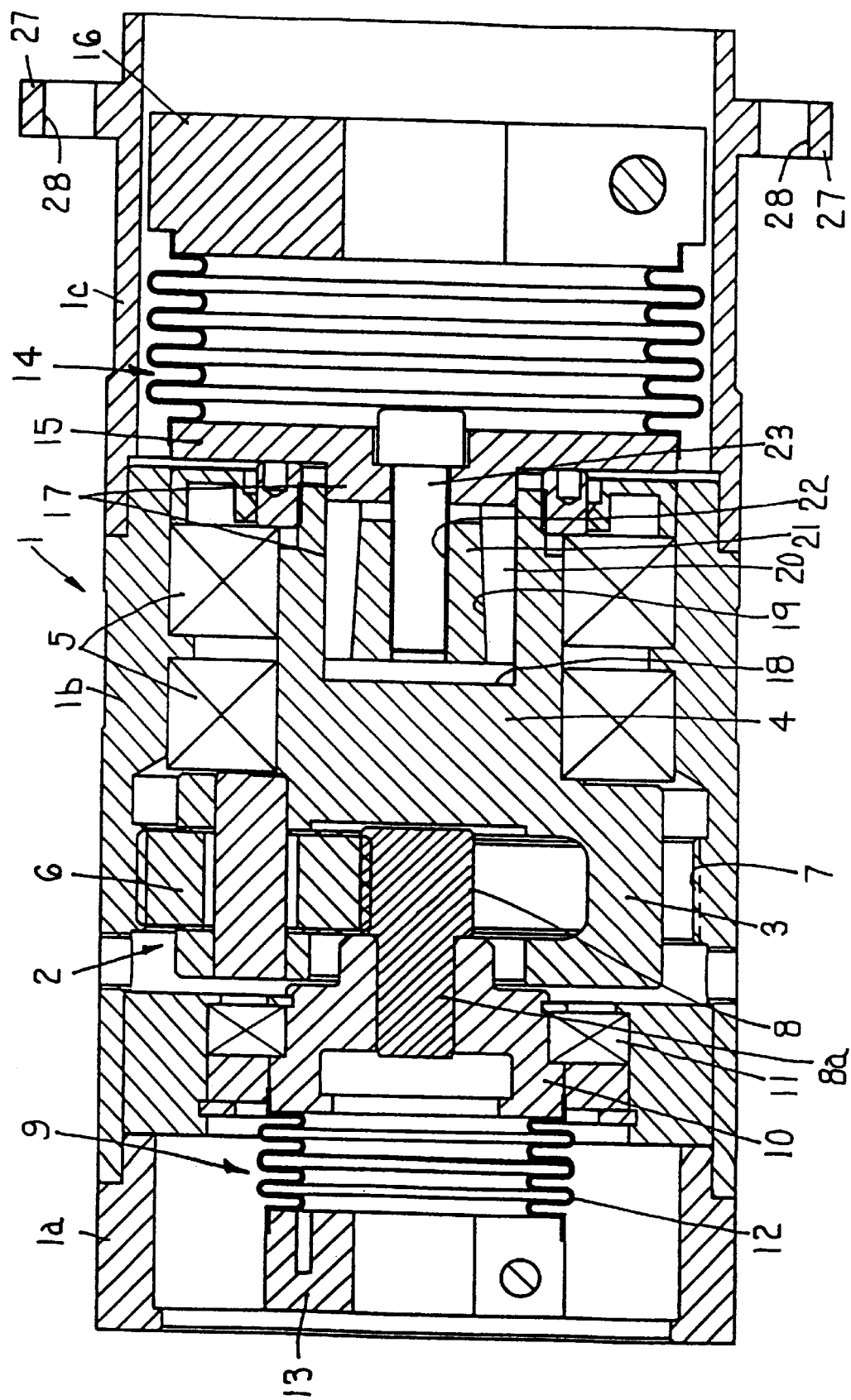
FIG. 1 is an axial section through a first embodiment of the planetary gear.

A planetary gear 2 is arranged in a common housing 1, which can consists of a several housing sections 1a, 1b and 1c. The gear comprises firstly a planet wheel carrier 3 with a shaft journal 4, which is rotatably mounted in the housing 1 by means of the bearing 5. The planet wheel carrier 4 carries one or more planet wheels 6, which engage with the annulus 7 and the sun wheel 8.

On the end of the planetary gear 2 on the input side there is provided a first compensating coupling 9. This comprises a coupling part 10 on the gear side, which is rotatably mounted in the housing 1 by a bearing 11. A pin 8a of the sun wheel 8 engages in the coupling part 10 and is connected rotationally fast with the coupling part 10. The coupling part 10 therefore also forms a component of the planetary gear 2, in that it serves for the rotational support of the sun wheel pin 8a. The compensating coupling 9 is advantageously in the form of a metal bellows coupling, whose metal bellows 12 is attached at one end to the bellows carrier forming the gear-side coupling part 10 and at the other end to the clamp collar 13. The clamp collar 13 serves for attachment to a drive shaft, not shown. The clamp collar 13 and the sensitive metal bellows 12 are enclosed in the housing section 1a.

A second compensating coupling 14 is provided on the output side of the planetary gear 2, with a gear-side coupling part 15. This compensating coupling 14 can also advantageously be in the form of a metal bellow coupling, whose bellows carrier forms the gear-side coupling part. The compensating coupling 14 can be connected through a clamp collar 15 or the like to a driven shaft, not shown. Instead of the illustrated metal bellows coupling another compensating coupling could be provided, e.g. a vibration damping elastomer coupling free from play. The second compensating coupling 14 is enclosed in the housing section 1c forming an integral component of the gear housing 1, so that the planetary gear can be fixed on to a stationary machine part through the housing section 1c. To this end the housing section 1c can comprise a plurality of attachment eyes 27 in the vicinity of its end remote from the gear 2, each with a bore 28 parallel to the axis. The housing section 1c moreover protects the sensitive metal bellows of the metal bellows coupling from damage and also protects the other coupling parts from contact.

The gear-side coupling part 15 has a projection 17 in one piece therewith, which engages in a recess 18 provided in the shaft journal 4. In this embodiment and in the embodiments shown in FIGS. 2 and 3 the pin 17 and the recess 18 extend into the region surrounded by the bearing 5 of the shaft journal 4. In this way the projection 17 and also the recess 18 do not require any additional space in the axial direction of the gear, whereby a particularly compact construction is achieved. The projection 17 and the recess 18 are components of a torque transmitting connection between the shaft journal 4 and the gear-side coupling part 14. In the embodiments shown in FIGS. 1 and 2 this torque transmitting connection is formed frictionally, while in the embodiment according to FIG. 3 an interlocking connection is provided.

According to FIG. 1 the projection 17 is externally cylindrical and has a conical bore 19 widening to the free end of the projection. The projection 17 is divided into a plurality of ring segments by a plurality of axially extending slots 20. A spreading cone 21 with a central threaded bore 22 is fitted in the conical bore 19. An axially directed screw 23 engages in this threaded bore and passes through the gear-side coupling part 15. On tightening this screw 23 the spreading cone 21 is drawn into the conical bore 19 and spreads the slotted part of the projection 17. The projection is in this way clamped fast in the recess 18, fast against and rotation and free from play.

Figure 2:
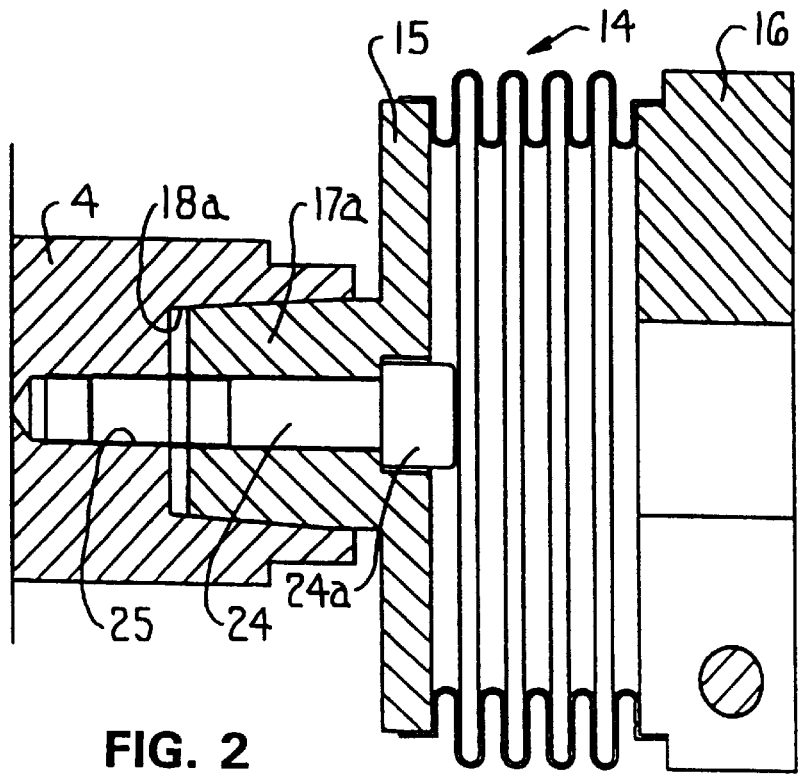
FIG. 2 is a partial axial section of a second embodiment.

In the embodiment shown in FIG. 2 the gear-side coupling part 15 has a projection 17a which is in the form of a cone tapering to the free end thereof. This cone engages in a conical recess 18a of the shaft journal 4. An axially directed, central screw 24 is furthermore provided to connect the gear-side coupling part 15 and the shaft journal 4 and is screwed into a threaded bore 25 provided at the bottom of the recess 18a. The head 24a of this screw bears on the side of the coupling part 15 facing away from the gear and is, like the head of the screw 23, accessible through the clamp collar 16 and the metal bellows of the compensating coupling 14.

Figure 3:
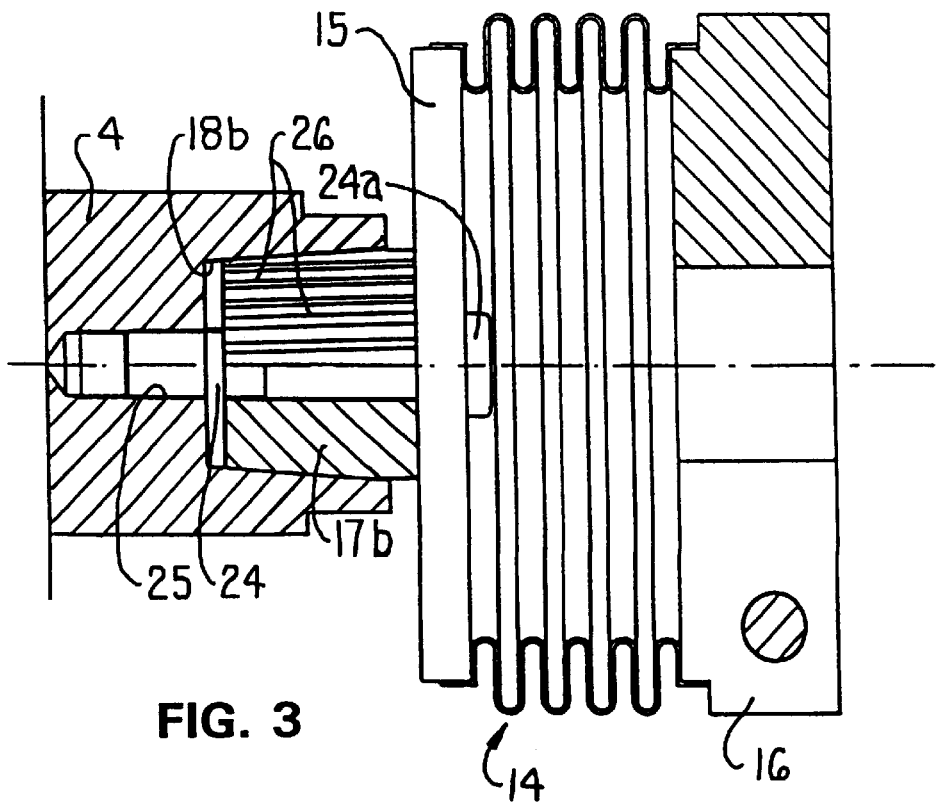
FIG. 3 is a partial axial section of a third embodiment.

In the embodiment shown in FIG. 3 the projection 17b of the gear-side coupling part 15 has external splines 26 tapering conically to the fee end of the projection and engaging in corresponding internal splines of the recess 18b of the shaft journal. The statements made in the description of the previous embodiment apply to the central screw 24.

Figure 4:
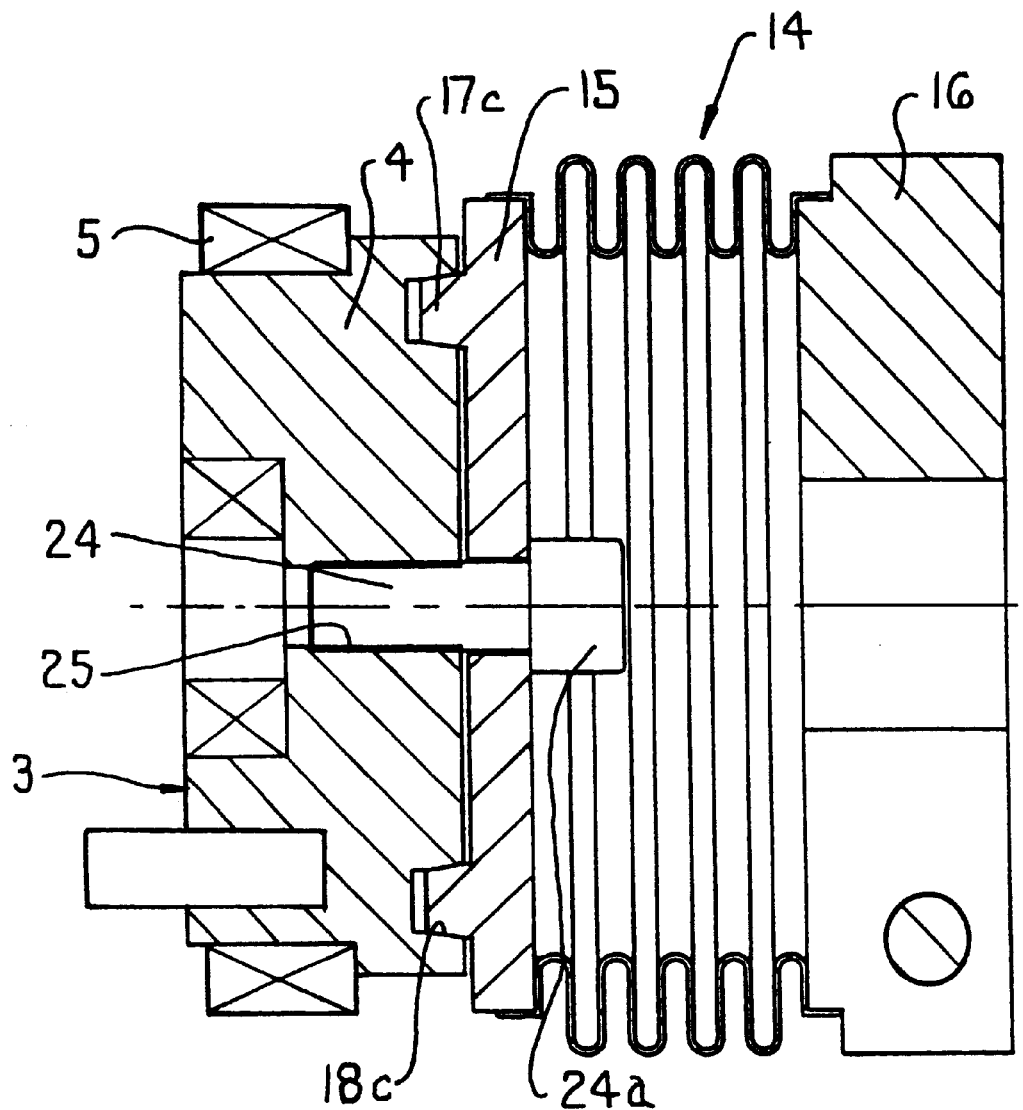
FIG. 4 is partial axial section of fourth embodiment.

In the embodiment shown in FIG. 4 the gear-side coupling part 15 of the compensating coupling 14 has an annular projection 17c with a conically tapering cross-section. An annular groove 18c is provided in the face of the shaft journal 4 of the planet wheel carrier 3 and also tapers conically, the annular projection 17c engages in this annular groove 18c. A central screw 24 serves to connect the coupling part 15 to the shaft journal 4. In order to achieve a short axial structural length, the annular groove 18c should be the smallest distance possible away from the bearing 5 of the shaft journal 4.

On the input side of the planetary gear there could be provided as the compensating coupling one which is only constructed to accommodate longitudinal displacements, e.g. from heating of the motor shaft.

What is claimed is:

1. A planetary gear with a compensating coupling, a housing enclosing the gear and the compensating coupling and a planet wheel carrier, which has a shaft journal rotatably mounted in the housing, wherein the compensating coupling is provided on the input side of the gear and its gear-side coupling part at the same time forms a component of the gear and is rotatably mounted in the housing, characterized in that a second compensating coupling (14) is provided on the output side of the gear (2), its gear-side coupling part (15) having a projection (17, 17a, 17b, 17c) which engages in frictional and/or interlocking manner in a recess (18, 18a, 18b, 18c) in the shaft journal (4), and in that the housing (1) has a housing section (1c) on the output side of the gear (2) which is an integral component of the housing (1) and encloses the second compensating coupling (14).

2. A planetary gear according to claim 1, characterized in that the projection (17, 17a, 17b) of the gear-side coupling part (15) and the recess (18, 18a, 18b) in the shaft journal (4) extend into the region thereof surrounded by the bearing (5).

3. A planetary gear according to claim 1, characterized in that the projection (17) of the gear-side coupling part (15) is externally cylindrical, has a conical bore (19) inside, widening to the free end of the projection and is divided by a plurality of axially extending slots (20) into a plurality of ring segments, in that a spreading cone (21) with a central threaded bore (22) is fitted into the conical bore (19) and in that an axially aligned screw (23) extends into the threaded bore through the gear-side coupling part (15).

4. A planetary gear according to claim 1, characterized in that the projection (17a) is in the form of a cone tapering to its free end, which engage in a conical recess (18a) of the shaft journal (4).

5. A planetary gear according to claim 1, characterized in that the projection (17b) has external splines (26) tapering to the free end thereof, which engage in corresponding conical internal splines in the recess (18b) of the shaft journal (4).

6. A planetary gear according to claim 1, characterized in that the projection (17c) of the gear-side coupling part (15) is annular with a conically tapering cross-section and in that an annular groove (18c) with a conically tapering cross-section is provided in the end face of the shaft journal (4) at the smallest possible spacing from the bearing (5) thereof, in which groove the projection (17c) engages.

7. A planetary gear according claim 4, characterized in that an axially directed central screw (24) is provided for connecting the gear-side coupling part (15) and the shaft journal (4), its head (24a) bearing on the side of the coupling part (15) facing away from the gear (2) and the screw extending through a central bore of the coupling part and being screwed into a central threaded bore (25) of the shaft journal (4).

8. A planetary gear according to claim 1, characterized in that at least one of the two compensating couplings (9, 14) is a metal bellows coupling, whose bellows carrier on the gear-side forms the gear-side coupling part (15).

9. A planetary gear according to claim 1, characterized in that the housing section (1c) comprises a plurality of attachment eyes (27) in the vicinity of its free end, remote from the gear (2), each with a bore (28) parallel to the axis.

* * * * *